United States Patent
Orlik et al.

(10) Patent No.: US 8,089,856 B2
(45) Date of Patent: Jan. 3, 2012

(54) ZERO CORRELATION ZONE BASED PREAMBLE FOR OVERSAMPLED OFDM NETWORKS IN URWIN

(75) Inventors: Philip V. Orlik, Cambridge, MA (US);
Qinghe Du, College Station, TX (US);
Chunjie Duan, Medfield, MA (US);
Zafer Sahinoglu, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 153 days.

(21) Appl. No.: 12/420,629

(22) Filed: Apr. 8, 2009

(65) Prior Publication Data
US 2010/0260276 A1    Oct. 14, 2010

(51) Int. Cl.
*H04J 11/00* (2006.01)

(52) U.S. Cl. .......................................... 370/208; 375/260

(58) Field of Classification Search .......... 370/203–210, 370/360, 503–516; 375/140–153, 260
See application file for complete search history.

(56) References Cited

U.S. PATENT DOCUMENTS

| | | | |
|---|---|---|---|
| 6,963,600 B1 * | 11/2005 | Fan et al. ...................... | 375/141 |
| 7,778,151 B2 * | 8/2010 | Bertrand et al. .............. | 370/208 |

* cited by examiner

*Primary Examiner* — Pao Sinkantarakorn
(74) *Attorney, Agent, or Firm* — Dirk Brinkman; Gene Vinokur (57) ABSTRACT

In an oversampled orthogonal frequency-division multiplexing (OFDM) orthogonal network, the preamble used for time synchronization does not have an ideal autocorrelation function due to guard bands, which degrade the accuracy of symbol timing. Therefore, a zero-correlation-zone (ZCZ) based preamble is used for time synchronization. Across correlation function (CCF) used for time synchronization is forced to 0 within a certain region around a main lobe. The length of the ZCZ is guaranteed to be larger than a cyclic prefix length of OFDM data symbols synchronization accuracy.

3 Claims, 4 Drawing Sheets

ZERO CORRELATION ZONE BASED PREAMBLE FOR OVERSAMPLED OFDM NETWORKS IN URWIN

FIELD OF THE INVENTION

The present invention relates generally to multiple access control (MAC) of communications networks, and more particularly to carrier allocation and transmission time sharing among multiple users in a wireless communications network that applies a MAC combing orthogonal frequency-division multiple-access (OFDMA) and time-division multiple-access (TDMA).

BACKGROUND OF THE INVENTION

In orthogonal frequency-division multiplexing (OFDM) networks, a preamble is used for synchronization and channel estimation. In oversampled OFDM networks, the preamble used for time synchronization does not have an ideal autocorrelation function. The ideal function is the Dirac delta function, which represents an infinitely sharp peak bounding unit area. This is due to a guard band, which degrades the accuracy of symbol timing.

Oversampled OFDM is typical of most wireless standards that employ OFDM, such as IEEE 802.11, IEEE 802.16 and 3GPP-LTE. Because it is not possible to obtain and ideal preamble sequence in such cases, it is desired to provide an optimal preamble.

SUMMARY OF INVENTION

In an oversampled orthogonal frequency-division multiplexing (OFDM) orthogonal network, the preamble used for time synchronization does not have an ideal autocorrelation function due to guard bands, which degrade the accuracy of symbol timing. Therefore, a zero-correlation-zone (ZCZ) based preamble is used for time synchronization. A cross correlation function (CCF) used for time synchronization is forced to 0 within a certain region around a main lobe. The length of the ZCZ is guaranteed to be larger than a cyclic prefix length of OFDM data symbols to increase synchronization accuracy.

DESCRIPTION OF THE PREFERRED EMBODIMENT

The embodiments of the invention provide a zero-correlation-zone (ZCZ) based preamble for time synchronization in oversampled orthogonal frequency-division multiplexing (OFDM) OFDM networks in URWIN. In particular, our preamble can force a cross correlation function (CCF) used for time synchronization to be 0 within a certain region around a main lobe. The length of the ZCZ is guaranteed to be larger than the cyclic prefix (CP) length of OFDM symbols. This increases the accuracy of synchronization. As used herein, the length (L) means a time duration. Throughout the disclosure we make reference to a specific design in which various parameters of the preamble are explicitly defined. We call this design URWIN (Ultra-Reliable Wireless Industrial Network) and provide the numerical quantities for the preamble design for exemplary purposes. The specific parameters for the URWIN along with specific preamble sequences are shown in Tables IV-VII in the Appendix.

Notations and Definitions

Convolution: The operator "*" denotes convolution of two sequences:

$$z_l = x_l * y = \sum_{m=\max(n-L_y+1,0)}^{\min(n,L_x-1)} x_m y_{l-m} \quad (1)$$

$$l = 0, 1, \ldots, L + L_y,$$

where $z_l$ is the convolution output of sequences $x_l$, $l=0, 1, \ldots, L_x-1$, and $y_n$, $n=0, 1, \ldots, L_y-1$, min and max represent functions that return minimum and maximum values, respectively, and m is a summation variable whose limits are given in Equation (1).

Circular Convolution:

For the sequences $x_l$ and $y_l$ with the same length L, the circular convolution output sequence $Z_l$, $l=0, 1, \ldots, L-1$, between these two sequences is well-known as $$z_l = x_l \otimes y_l \quad (2)$$
$$= \sum_{m=0}^{L-1} x_m y_{(l-m)_L}$$
$$= \sum_{m=0}^{l} x_m y_{l-m} + \sum_{m=l+1}^{L-1} x_m y_{L+l-m},$$

where $(\ )_L$ denotes the modulus operation after division by L, and $\otimes$ is the circular convolution operator.

Circular Cross Correlation Function (Circular CCF)

For the two sequences $x_l$ and $y_l$ with the same length L, the circular CCF between the two sequences is, denoted by $\psi_{xy}(\tau)$, is defined as $$\psi_{xy}(\tau) = x_\tau \otimes y^*_{-\tau} = \sum_{m=0}^{L-1} x_m y^*_{(m-\tau)_L}, \quad (3)$$

where $(\ )_L$ denotes the modulus after division by L.

Vector Representation

Any sequence $w_l$, $l=0, 1, \ldots L_w-1$ can be written in a column vector form as w, $(w_0, w_1, \ldots, w_{L_w-1})^T$, where T denotes the transpose operator.

Eqs. (1) and (2) can be respectively rewritten as $z = x * y$ and $z = x \otimes y$.

Preamble Structure and Transmission Model

Table I lists parameters for the OFDM/OFDMA network. The URWIN network has specific parameters. Our preamble is derived as a general approach for various OFDM parameters. Moreover, the parameters defined in Table I are for OFDM data symbols.

The OFDM symbols in the preamble can differ from the OFDM data symbols, e.g., the CP length for some symbols differ when the OFDM symbols in the preamble have a different structure. This is explicitly noted.

TABLE I

FDMA parameter Description and URWIN values

Figure 2:
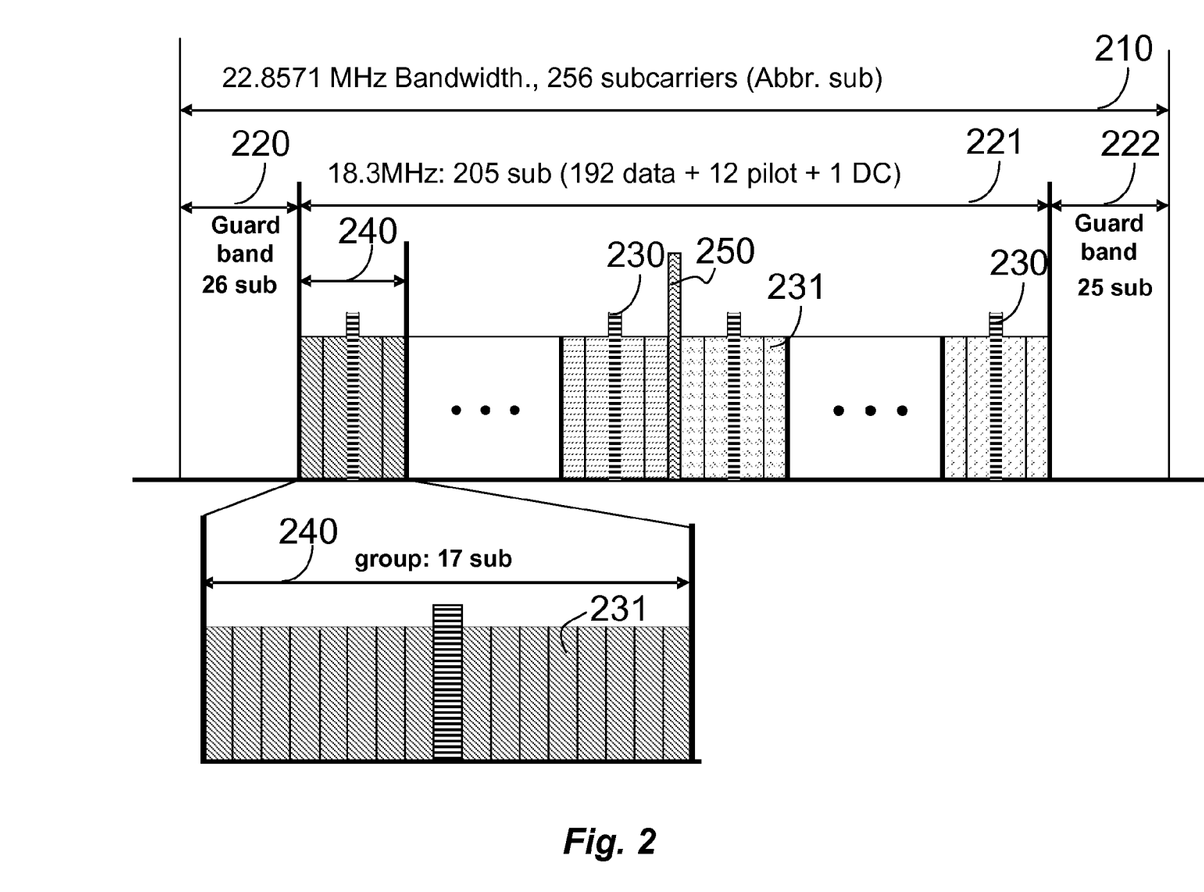
FIG. 2 is an illustration of the allocation of sub-carriers within the system band into guard-band sub-carriers, pilot sub-carriers and data sub-carriers according to the invention.

| Variable | Name | Properties | URWIN values |
|---|---|---|---|
| N | FFT size | $N = 2^k$, $k = 2, 3, \ldots$ | 256 |
| U | The number of useful subcarriers indexed by $-U/2$, $-U/2 + 1, \ldots, -1, 1, 2, \ldots, U/2$. Other subcarriers are direct current(DC) subcarrier, or belong to the guard band, as shown in FIG. 2 | $U <= N$ | 204 |
| $T_g$ | The length of the CP for data bearing OFDM symbols | | 0.7 μs |
| $T_b$ | Useful time length of an OFDM symbol | | 11.2 μs |
| $T_s$ | Length of total OFDM symbol | $T_s = T_b + T_g$ | 11.9 μs |
| $f_s$ | Sampling rate | $f_s = N/T_b$ | 22.857142 MHz |
| $N_g$ | Number of samples within a CP length | $N_g = T_g f_s$ | 16 |
| $N_s$ | Number of samples within an entire OFDM symbol | $N_s = T_s f_s$ | 272 |

Figure 1:
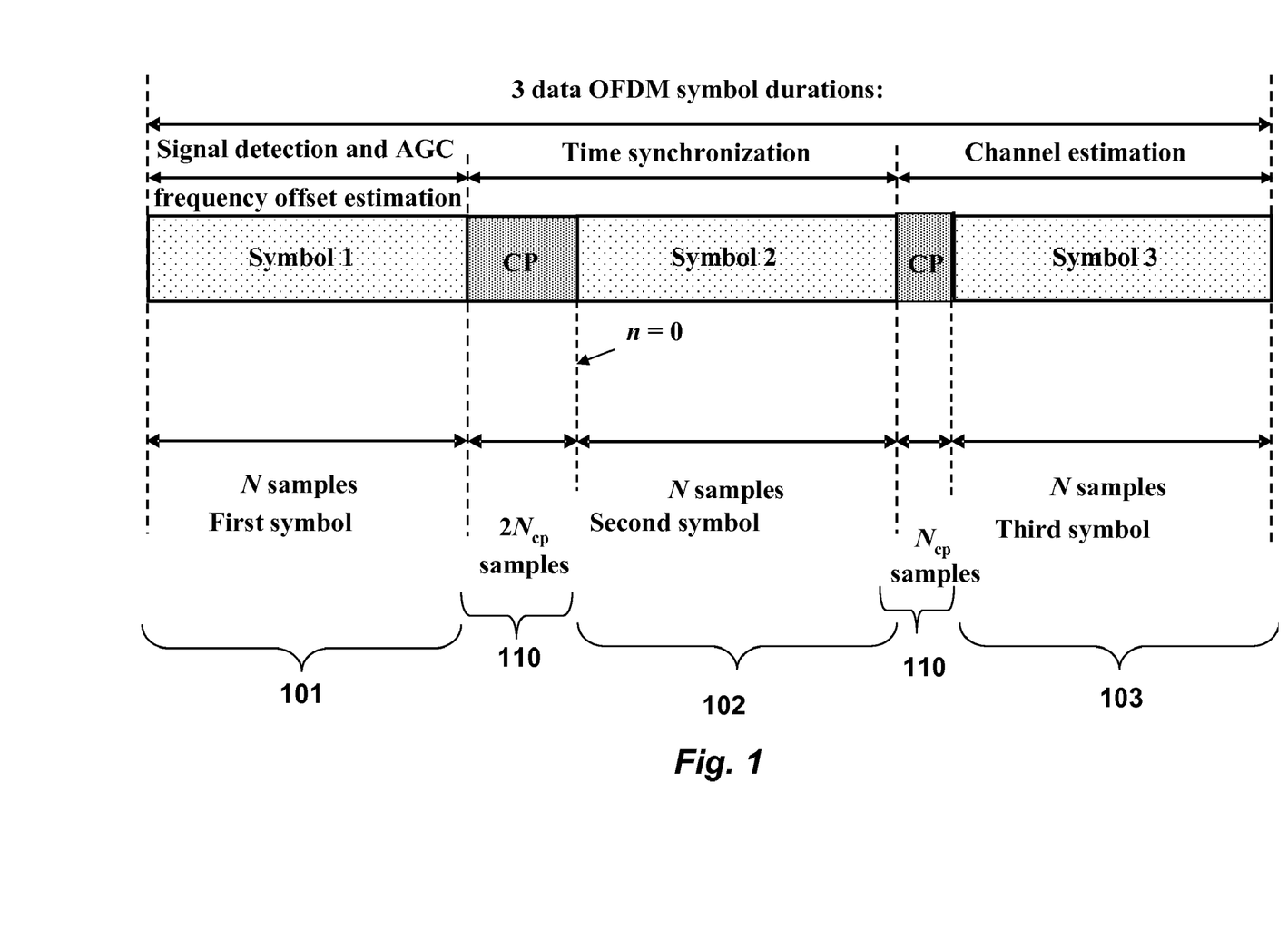
FIG. 1 is an illustration of an OFDM preamble with three symbols, and for what each symbol is used for according to the invention.

As shown in FIG. 1A, the preamble for URWIN is constructed by concatenating three OFDM symbols 101-103, separated by CPs 110. The length of the payload part of each of the three symbols is the same as that in OFDM data symbols.

The first symbol of the preamble is used for signal detection (SD), automatic gain control (AGC), and frequency offset estimation (FOE). Because the CP is not an essential component for signal detection, AGC, and frequency offset estimation, we do not use the CP for the first symbol. The 11.2 μs length of the first symbol is longer than the length specified in the 802.11 standard for signal detection and AGC.

The second preamble symbol 102 is used for symbol synchronization, which has a CP with 1a length of $2T_g$. We use a longer length for the CP of the second symbol because the ZCZ length is longer than the CP length of the data symbols.

The third symbol 103 is used for channel estimation, and has a CP with the same length as data symbols. The functions and parameters for the three symbols of preamble are summarized in Table II.

TABLE I

Length of Preamble symbols

| Symbol Index | CP Length | Payload Length | Total Length | Functions |
|---|---|---|---|---|
| 1-First | 0 | $T_b$ | $T_b$ | SD, AGC, FOE |
| 2-Second | $2T_g$ | $T_b$ | $2T_g + T_b$ | Synchronization |
| 3-Third | $T_g$ | $T_b$ | $2T_g + T_b$ | Channel Estimation |

Transmitted and Received Signal Model

With the above structure, the transmitted preamble signal in discrete time, can be denoted by $\Phi_n$, which is a piecewise function expressed as $$\phi_n = \begin{cases} f_{n+N+2N_g}, & \text{if } n = -(2N_g + N), -(2N_g + N - 1), \ldots, -(2N_g + 1) \\ s_n & \text{if } n = -2N_g, -(2N_g - 1), \ldots, N_g + 1 \\ c_{n-N-N_g} & \text{if } n = N, N+1, \ldots, 2N + N_g - 1, \end{cases} \quad (4)$$

where $f_n$, $s_n$ and $c_n$ denote the first, second, and third OFDM symbols in the preamble, respectively. The variables Ng, Ns, and N are defined in Table I, and n=0 corresponds to the beginning of the useful part of the second symbol, as shown in FIG. 1.

More specifically, we can express the time domain sequences, $f_n$, $s_n$ and $c_n$ through the Fourier relationship to the frequency domain symbols $F_k$, $S_k$, and $C_k$. Doing so we obtain the explicit expression for each preamble component as follows.

$$f_n = \frac{1}{\sqrt{U}} \sum_{k=-N/2}^{N/2-1} F_k e^{j\frac{2\pi nk}{N}}, \forall n, \quad (5)$$

$$s_n = \frac{1}{\sqrt{U}} \sum_{k=-N/2}^{N/2-1} S_k e^{j\frac{2\pi nk}{N}}, \forall n, \quad (6)$$

$$c_n = \frac{1}{\sqrt{U}} \sum_{k=-N/2}^{N/2-1} C_k e^{j\frac{2\pi nk}{N}}, \forall n, \quad (7)$$

where j is the imaginary number $\sqrt{-1}$, k, indexes the subcarriers of the OFDM symbol, n indexes the time/sample of the corresponding time domain representation of the preamble symbols, $F_k$, $S_k$, and $C_k$, are the frequency-domain values (complex-valued) on the $k^{th}$ subcarrier for the first, second, and the third symbol, respectively, in the preamble. Since we only focus on the useful subcarriers, Eqs. (6)-(8) can be rewritten as $$f_n = \frac{1}{\sqrt{U}} \sum_{u=0}^{U-1} F_{k(u)} e^{j\frac{2\pi nk(u)}{N}} \forall n, \quad (8)$$

$$s_n = \frac{1}{\sqrt{U}} \sum_{u=0}^{U-1} S_{k(u)} e^{j\frac{2\pi nk(u)}{N}} \forall n, \quad (9)$$

$$c_n = \frac{1}{\sqrt{U}} \sum_{u=0}^{U-1} C_{k(u)} e^{j\frac{2\pi nk(u)}{N}} \forall n \quad (10)$$

where k(u) maps $0, \ldots, U-1$ to the real subcarrier indices k as $$k(u) = \begin{cases} u + 1 & u = 0, 1, \ldots, U/2 - 1 \\ u - U & u = U/2, U/2 + 1, \ldots, U - 1 \end{cases}. \quad (11)$$

The received preamble is $$r_n = \phi_n * h_n + \sigma_n, \quad (12)$$

where $h_n$, $n = 0, 1, \ldots, D_{max} - 1$, is the channel impulse response, and $\sigma_n$ is the additive white Gaussian noise (AWGN) with power spectrum density (PSD) $N_0$. We assume that the CP length of normal data OFDM symbols is larger than the maximum delay caused by the channel. Thus, we have $L \leq N_g$.

Designs of the First and Third OFDM Preamble Symbols

Figure 4:
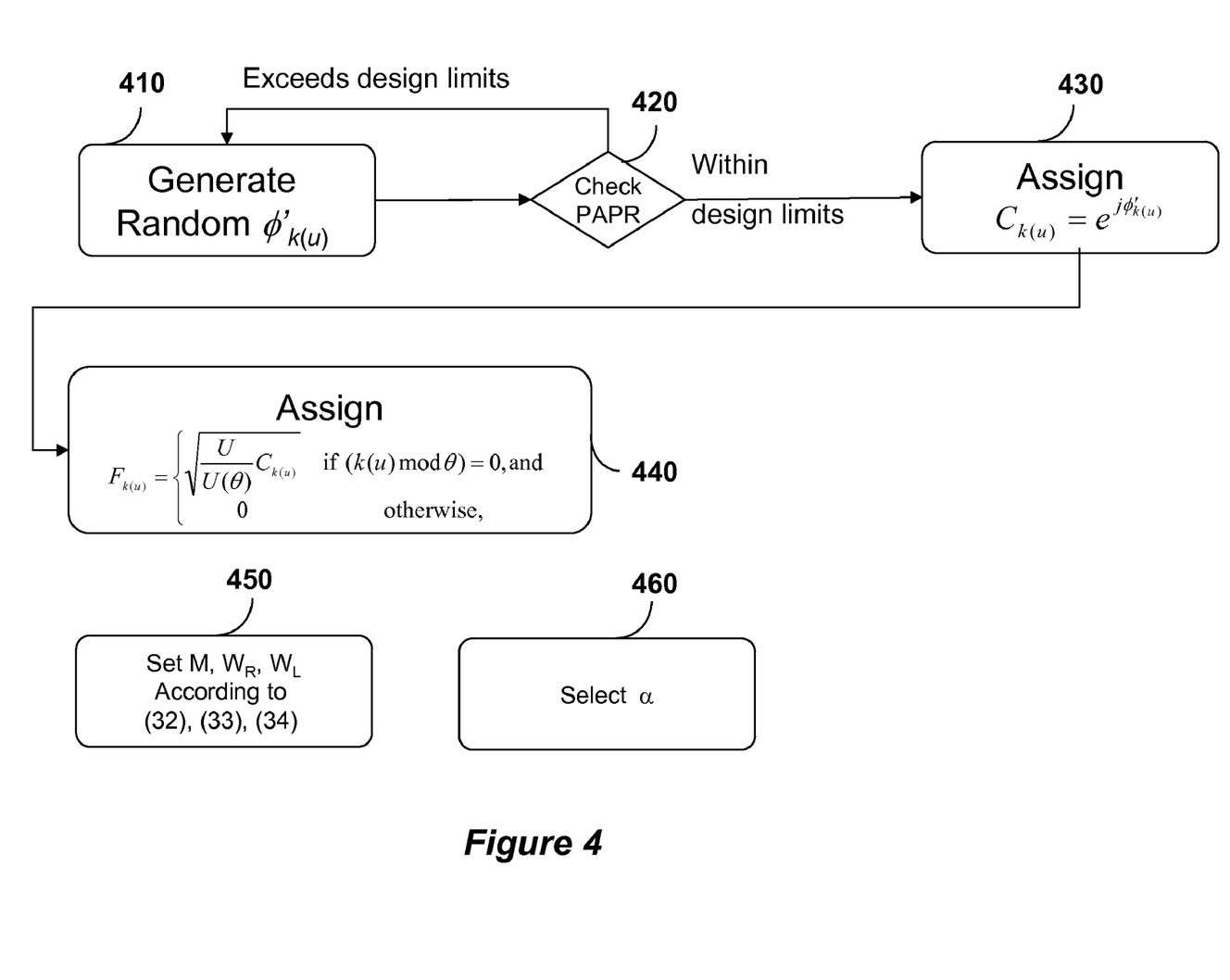
FIG. 4 illustrates the algorithm for designing the OFDM symbols according to the invention

FIG. 4 illustrates the algorithm according to the invention for assigning the third symbol $C_{k(u)}$ 430 and the first symbol $F_{k(u)}$ 440 based on part of third symbols $C_{k(u)}$.

Third Preamble Symbol

The third symbol 430 is to be used for channel estimation. An essential requirement for a high quality channel estimation sequence is a uniform-power across the frequency domain so that all subcarriers are sounded with equal power. Another general requirement is to minimize the peak-to-average-ratio (PAPR). To fulfill the uniform power constraint, we set the normalized magnitude of the power for $C_{k(u)}$ to 1 for all subcarriers u. The third symbol $C_{k(u)}$ uses quadrature phase-shift keying (QPSK) to simplify the implementation. Then, we have $$C_{k(u)} = e^{j\phi'_{k(u)}}, \tag{13}$$

where the phase $\phi'_{k(u)} \in \{\pi/4; 3\pi/4; 5\pi/4; 7\pi/4\}$ is selected as follows.

We randomly generate many $\{\phi'_{k(u)}\}_{u=0}^{U}$ by using a random-number-generator 410, such that we can get many realizations of $\{C_{k(u)}\}_{u=0}^{U}$. Among these realizations, we select the one with the minimum PAPR 420. The selected sequence $C_{k(u)}$ 430 is shown in Table IV, under which the obtained PAPR is 5 dB (as listed in Table III).

First Preamble Symbol

The OFDM symbol used for signal detection and AGC needs to be periodic with a relatively short period. To satisfy this constraint, we set the first symbol $F_{k(u)}$ 440

$$F_{k(u)} = \begin{cases} \sqrt{\dfrac{U}{U(\theta)}} C_{k(u)} & \text{if } (k(u) \bmod \theta) = 0, \text{ and} \\ 0 & \text{otherwise,} \end{cases} \tag{14}$$

where $\theta$ is a positive integer, and $U(\theta)$ is the number of subcarriers satisfying $(k(u) \bmod (\theta)) = 0$. Using equation (9), we see that the time domain representation of the first symbol, $f_n$, has a period equal to $T_b=\theta$. In the URWIN network, we set $\theta=16$ based on the following reasons. Using $\theta=16$, for the first OFDM symbol, we obtain 16 periods, each with 16 samples, comparable to 802.11 OFDM networks. This duration is long enough for fast frequency offset estimation. Moreover, the power is uniformly distributed to 24 subcarriers. The spacing between two adjacent subcarriers is to $16=T_b=1.43$ MHz.

Because the coherence bandwidth is a few megahertz, the above setting can achieve full frequency diversity in signal detection. Note that the $\theta$ can be adjusted meet other requirements.

CCF Analyses of the Second Preamble Symbol

The time-domain signal $s_n$ usually needs to be a pseudo-random waveform, such that its autocorrelation function (ACF) is close to a single pulse with a single peak, which can be used to indicate the accurate timing. To achieve the single-peak waveform, the receiver can pass the signal through an matched filter with a response of $s^*_n$.

The ACF of an ideal synchronization signal should be a delta function. With this property, the output of the matched filter is exactly the same as the channel impulse response. Other preferable properties include constant amplitude in the time domain, and uniform power in the frequency domain.

A constant amplitude in the time-domain yields the lowest PAPR, while a uniform power in the frequency domain is fair for all subcarriers to combat frequency-selective fading. For the ACF to be a delta function, the power must be uniform power for all subcarriers.

However, in practice, OFDM designs allocate a portion of the total bandwidth 210 as a guard band 220-222 one at each end of the frequency spectrum such that the sampling rate of an OFDM signal is always higher than the useful bandwidth. We call such a network an oversampled OFDM network. Each guard band 220-222 contains a number of sub-carriers 231. The number of sub-carriers in one guard band can be different from the other. The carriers in the usable band 221 are further divided into groups 240. One sub-carrier is dedicated as a pilot sub-carrier 230 in each group 240. In the oversampled OFDM network, uniform power across the frequency domain is impossible, and thus the perfect autocorrelation property is not achievable, which motivates us to design new synchronization signal for oversampled OFDM system and the URWIN network specifically.

Usually, the signal for synchronization is periodic. Therefore, we assume that the second OFDM preamble symbol is periodic with a period equal to $N/\alpha$, where $\alpha 2 \in \{1, 2, 4, \ldots, (\log_2 N)-1\}$, which forces $$S_{k(u)} = 0 \text{ for } \alpha \neq 1 \text{ and } (k(u) \bmod \alpha) \neq 0; \forall n. \tag{16}$$

At the receiver, we pass the signal through a local correlator denoted by $\tilde{s}_n$, $n=0, 1, \ldots, N/\alpha-1$. Then, the output of the correlator is the convolution between $\tilde{s}_n$ and $s_n$, which is $$r_n * \tilde{s}_{-n}^* = (\phi_n * h_n + \sigma_n) * \tilde{s}_{-n}^*. \tag{17}$$

If we set $\tilde{s}_n = s_n$, then the correlator is a matched filter. The matched filter maximizes the received SNR. However, the output is not necessarily a sharp and accurate timing metric. We provide an alternative $\tilde{s}_n$ for accurate timing.

By, applying the periodic property of $s_n$, we obtain $$r_n * \tilde{s}_{-n}^* = s_n * \tilde{s}_{-n}^* * h_n \sigma_n * \tilde{s}_{-n}^* = \psi_{s\tilde{s}}((n)_{N/\alpha}) * h_n + \sigma_n * \tilde{s}_{-n}^*,$$

if $n \in [-2N_g, -2N_g+1, \ldots, (\alpha-1)N/\alpha]$.

Using Eqn. (3), we further derive $$\psi_{s\tilde{s}}(\tau) = \Sigma s_m \tilde{s}_{(m-\tau)_N}^*,$$

which can be simplified to $$\psi_{s\tilde{s}}(\tau) = \frac{N}{\alpha U} \sum_{u=0}^{U-1} S_{k(u)} \tilde{S}_{k(u)}^* e^{j\frac{2\pi k(u)}{N}\tau}. \tag{19}$$

Equation (19) can be rewritten in vector form as $$\psi_{s\tilde{s}} = \Omega(\alpha) \mu(\alpha), \tag{20}$$

where $\psi_{s\tilde{s}}$ is an $N/\alpha$-dimensional column vector $$\psi_{s\tilde{s}} \triangleq \left(\psi_{s\tilde{s}}(0), \psi_{s\tilde{s}}(1), \psi_{s\tilde{s}}(2), \ldots, \psi_{s\tilde{s}}\left(\frac{N}{\alpha}-1\right)\right)^T, \tag{21}$$

where $\mu(\alpha)$ is a $U(\alpha)$-dimensional column vector, and $\Omega(\alpha)$ is a $(N(\alpha)$ by $U(\overline{\alpha}))$ matrix. $U(\alpha)$ denotes the number of subcarriers with $k(u) \bmod \alpha = 0$. More specifically, $\Omega(\alpha)$ and $\mu(\alpha)$ are constructed from an N by U matrix $\Omega$, and a U by 1 vector $\mu$, respectively, which are $$\Omega = \begin{bmatrix} 1 & 1 & \cdots & 1 \\ e^{j\frac{2\pi k(0)}{N}} & e^{j\frac{2\pi k(1)}{N}} & \cdots & e^{j\frac{2\pi k(U-1)}{N}} \\ \vdots & \vdots & \ddots & \vdots \\ e^{j(N-1)\frac{2\pi k(0)}{N}} & e^{j(N-1)\frac{2\pi k(1)}{N}} & \cdots & e^{j(N-1)\frac{2\pi k(U-1)}{N}} \end{bmatrix}, \tag{22}$$

$$\mu = \begin{pmatrix} S_{k(0)} \tilde{S}_{k(0)}^* \\ S_{k(1)} \tilde{S}_{k(1)}^* \\ S_{k(2)} \tilde{S}_{k(2)}^* \\ \vdots \\ S_{k(U-1)} \tilde{S}_{k(U-1)}^* \end{pmatrix}.$$

Then, we construct the new matrix $\Omega(\alpha)$ and vector $\mu(\alpha)$ by the following steps 1) remove the $u^{th}$ column from $\Omega$ for all $u$ satisfying $(k(u) \mod \alpha) \neq 0$;
2) removing the $i^{th}$ row from $\Omega$ for all $i \in \{N/\alpha, N/\alpha+1, \ldots, N-1\}$; and
3) The new vector $\mu(\alpha)$ is obtained by removing the $u^{th}$ element from $\mu$ for all $u$ satisfying $(k(u) \mod \alpha) \neq 0$.

As shown in the above equations, the correlator output can be written in the form of the circular CCF between $s_n$ and $\tilde{s}_n$. To obtain a sharp metric to indicate the time synchronization, we determine $\mu(\alpha)$ such that $\psi_{s\tilde{s}}=(1,0,\ldots,0)^T$. However, note that the equation $$\psi_{s\tilde{s}}=\Omega(\alpha)\mu(\alpha)=(1,0,\ldots,0)^T \quad (23)$$

is inconsistent, implying that we cannot find such a vector $\mu$. Therefore, we provide a zero-correlation-zone (ZCZ) based preamble.

ZCZ Based Preamble

Because the perfect correlation property can not be achieved because a solution to Equation (23) is not possible), we design the preamble such that the circular CCF $\psi_{s\tilde{s}}$ has a zero correlation zone. The ZCZ has been used in CDMA networks.

However, how to apply ZCZ sequences in an oversampled OFDM network has neither been well understood, nor thoroughly studied. We apply the ZCZ sequences into the preamble design to enable more efficient and reliable time synchronization.

Figure 3:
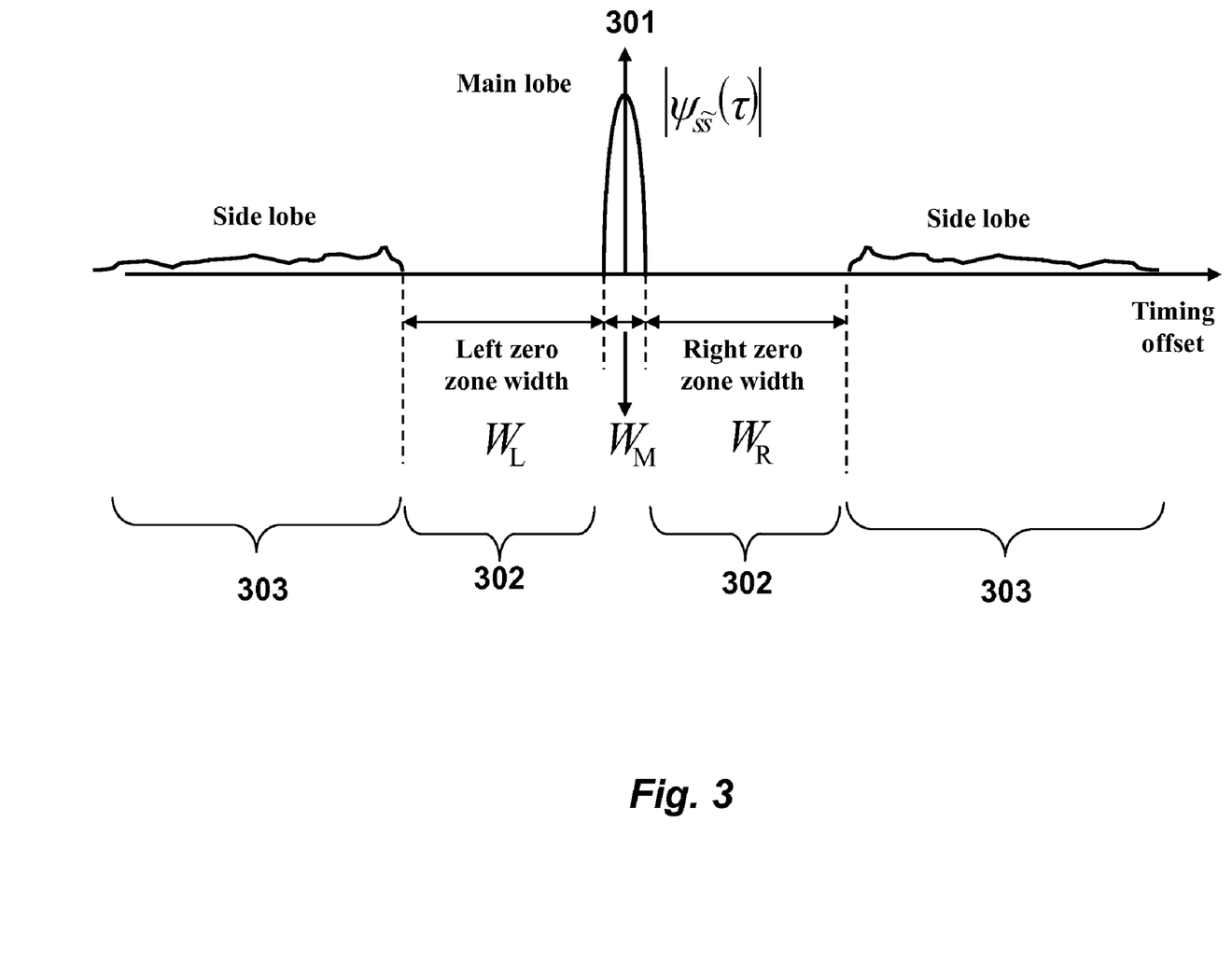
FIG. 3 shows the Zero Correlation Zone (ZCZ) of the autocorrelation of a ZCZ sequence according to an embodiment of the invention.

FIG. 3 shows the ZCZ according to an embodiment of the invention. The circular CCF $\psi_{ss}(\tau)$ is partitioned into a main lobe 310, a zero correlation zones (ZCZ) 302, and side lobes 303.

Main Lobe

The peak amplitude of $\psi_{ss}(\tau)$ is at $\tau=0$. The main lobe covers a small region around $\tau=0$. The main lobe width, denoted by $W_M$ (number of samples), is as small as possible to obtain good time resolution for synchronization. We set $W_M=2M+1$ for $M \geq 0$.

Zero Correlation Zone

On the left-hand side of the main lobe, we $\psi_{ss}(\tau)=0$ if $\tau \in [-W_L-M, -M-1]$. Note that $\psi_{ss}(\tau)$ can be treated as a periodic signal with period equal to $N/\alpha$. The interval $[-W_L-M, -M-1]$ is the left ZCZ 302. A similar interval $[M+1, W_R+M]$ of length $W_R$, within which $\psi_{ss}(\tau)=0$ holds, is on the right-hand side of the main lobe and is the right ZCZ 302. The left and right ZCZs form the ZCZ.

In order to better acquire the delay feature of the channel impulse response (CIR) for accurate time synchronization, given CIR $h(\tau)$, we expect the convolution between the main lobe of $\psi_{ss}(\tau)$ and $h(\tau)$ to be in the ZCZ. Following this principle, $W_L$ and $W_R$ are larger than the maximum delay spread. Because the CP length of the data symbol is longer than the maximum delay spread, $W_L$ and $W_R$ are larger than $N_g$, i.e., $W_L, W_R \geq N_g$. We set $W_L = W_R$.

Side Lobe

All other regions of $\psi_{ss}(\tau)$ belong to the side lobe. We suppress the peak to side-lobe ratio (PSR) between the peak of $|\psi_{ss}(\tau)|$ and the maximum amplitude of the side lobe. However, there is a tradeoff among the PSR, main lobe width, and ZCZ length. Generally, a smaller main lobe width and/or longer ZCZ degrade the PSR in an oversampled OFDM network.

Determining $\mu$

The CCF $\psi_{s\tilde{s}}(\tau)$ is $$\psi_{s\tilde{s}} = \begin{pmatrix} \underbrace{\psi_{s\tilde{s}}(0)}_{peak}, \underbrace{\psi_{s\tilde{s}}(1), \ldots, \psi_{s\tilde{s}}(M)}_{part\ of\ main\ lobe}, \underbrace{0, \ldots, 0}_{\substack{right\ ZCZ \\ W_R\ zeros}}, \ldots, \underbrace{0, \ldots, 0}_{\substack{side\ lobe}}, \underbrace{0, \ldots, 0}_{\substack{right\ ZCZ \\ W_R\ zeros}}, \\ \underbrace{\psi_{s\tilde{s}}(N\alpha - M), \ldots, \psi_{s\tilde{s}}\left(\frac{N}{\alpha}-1\right)}_{part\ of\ main\ lobe} \end{pmatrix}^T \quad (24)$$

To obtain above vector, we guarantee that $\mu$ is orthogonal to the vector space spanned by $$\Theta = \{\Omega_{M+1}^T(\alpha), \ldots, \Omega_{M+W_R}^T(\alpha), \\ \Omega_{N/\alpha-M-W_L}^T(\alpha), \ldots, \Omega_{N/\alpha-M-1}^T(\alpha)\}, \quad (25)$$

where $\Omega_i^T(\alpha)$ is the $i^{th}$ row vector of matrix $\Omega(\alpha)$. Such a $\mu(\alpha)$ can be determined using the procedure below.

1) Initialize a $U(\alpha) \times 1$ column vector, denoted by $S$, based on Eq. (31);
2) Find a set of orthogonal basis $\{\omega_i\}_{i=0}^{W_R+W_L-1}$ spanning $\Theta$;
3)

$$S := S - \sum_{i=0}^{W_R+W_L-1} \omega_i^H S \omega_i S := S,$$

4)

$$S = \frac{U}{\|S\|_1} S,$$

and
5) $\mu(\alpha):=S$.

The above procedure guarantees that the $\mu(\alpha)$ is orthogonal to every vector spanned by $\Theta$.

The second step can be performed by Gram-Schmidt orthonormalization, or a singular value decomposition (SVD). The third makes the vector $S$ orthogonal to all vectors in $\Theta$. By inserting $\mu(\alpha)=S$ into Eqn. (20), we obtain the ZCZ for Eqn. (24).

Method to Determine $S_{k(u)}$ and $\tilde{S}_{k(u)}$

By applying Eqn. (16), we obtain the $U \times 1$ vector $\mu$, form which we will determine $\tilde{S}_{k(u)}$ and $\tilde{S}_{k(u)}$. When using the matched filter, $\mu$, becomes a real-valued vector $(|S_{k(0)}|^2, |S_{k(1)}|^2, \ldots, |S_{k(U-1)}|^2)^T$. However, for the desired $\psi_{s\tilde{s}}$, the expected vector $\mu(\alpha)$ can be complex-valued. Therefore, we modify the matched filter with phase as $$\tilde{S}_{k(u)} = S_{k(u)} e^{j\phi_{k(u)}} \forall u=0, 1, 2, \ldots, U-1, \quad (26)$$

which results in $$\mu = (|S_{k(0)}|^2 e^{j\phi_{k(0)}}, |S_{k(1)}|^2 e^{j\phi_{k(1)}}, \ldots, |S_{k(U-1)}|^2 e^{j\phi_{k(U-1)}})^T, \quad (27)$$

based on Eqn. (22).

The disturbing phase $\phi_{k(u)}$ is obtained from $\mu$. According to Eqns. (26) and (27), we obtain amplitudes $|S_{k(u)}|$ and $|\tilde{S}_{k(u)}|$ as $$|S_{k(u)}| = |\tilde{S}_{k(u)}| = \sqrt{\mu} \ \forall u=0, 1, 2, \ldots, U-1.$$

The power loss during peak detection, due to phase disturbance, is negligible, see the last column of Table III. Our technique has the following advantages. We maintain the same amplitude property in the frequency domain as compared to the matched filter. The original phase of $S_{k(u)}$ do not affect the amplitude or the phase of $\mu$. Thus, we can minimize the PAPR by setting the phase of $S_{k(u)}$ independently.

The phase of $S_{k(u)}$ requires that the following properties hold. 1) The preamble should appear as a pseudo-random waveform in the time-domain 2 the sequence should have as low a PAPR as possible. Eqns. (26)-(28) can only the guarantee the preamble sequence has a ZCZ, but not the pseudo-random time-domain signal. Therefore, we apply a pseudo-random scrambling phase sequence $\xi_{k(u)}$ (the phase uniformly distribution in $[0, 2\pi)$ to the amplitude $|S_{k(u)}|$ $$S_{k(u)} = |S_{k(u)}|e^{j\xi_{k(u)}}. \quad (29)$$

The PAPR varies with the selection $\xi_{k(u)}$. To achieve a low PAPR, we examime random phase sequences, and select the one with the lowest PAPR for randomizing.

Parameter Selection

Initialization of S

The vector S is initialized as the least square solution to $$\Omega(\alpha)S = \left(1, \underbrace{0, \ldots, 0}_{N/\alpha-1 \text{ zeros}}\right)^T, \text{ and} \quad (30)$$

$$S = \hat{\Omega}(\alpha)\left(1, \underbrace{0, \ldots, 0}_{N/\alpha-1 \text{ zeros}}\right), \quad (31)$$

where $\hat{\Omega}(\alpha)$ 460 denotes the psudeo-inverse of $\Omega(\alpha)$.

Selection of Main Lobe Width and ZCZ Length

Given the main-lobe width and ZCZ length, we determine the corresponding OFDM symbol as described above. We select the length that can maximize the PSR to improve synchronization. Before searching for the optimal parameter set, we identify the domain of parameters M, $W_R$, and $W_L$ 450. The selection of the main-lobe width (2M+1) satisfies $$(2M+1) + D_{max} - 1 \leq N_g. \quad (32)$$

where $D_{max}$ is the maximum delay spread of the channel, and $N_g$ is the CP length. This constraint guarantees that the convolution-output length between the main lobe of $\psi_{ss}(\tau)$ and $h(\tau)$ does not exceed $N_g$.

For the ZCZ length, we require that $$W_R = W_L \geq N_g, \quad (33)$$

which guarantees that the ZCZ length is long enough to acquire the time-domain channel features.

Because the rank of $\Omega(\alpha)$ is equal to $2\lfloor U/2\alpha \rfloor$, the maximum $W_R$ is limited such that $$2W_R \leq 2\lfloor U/2\alpha \rfloor - 1. \quad (34)$$

If the above condition is violated, the number of independent vectors in $\Theta$ becomes $2\lfloor U/2\alpha \rfloor$, the algorithm in FIG. 4 leads to $\mu(\alpha)=0$. To identify the domain of $W_R$ and M (characterized by Eqs. (32)-(34)), one can optimize PSR in order to suppress the potential ambiguity in time synchronization. Denoting PSR by $\rho(W_R, M)$, we then use a numerical search to find the optimal implementation, $W_R^*$ and $M^*$, such that $$(W_R^*, M^*) = \underset{(W_R, M)}{\arg\min}\{\rho(W_R, M)\}. \quad (35)$$

TABLE II

Parameter Comparison Among various Preamble Designs

| Scheme | FFT size N | Number of used subcarriers | Period (Samples) | 10 dB Main lobe Width | ZCZ length ($W_L = W_R$) | PSR (dB) | PAPR (dB) | Power loss for peaf of CCF # (dB) |
|---|---|---|---|---|---|---|---|---|
| ZCZ, 2nd symbol, $\alpha = 1$, U = 204 | 256 | 204 | 256 | 5 | 17 | 17.58 | 4.81 | −0.019 |
| ZCZ, 2nd symbol, $\alpha = 2$, U = 102 | 256 | 102 | 128 | 5 | 17 | 14.52 | 4.08 | −0.017 |
| ZCZ, 2nd symbol, $\alpha = 4$, U = 50 | 256 | 50 | 64 | 5 | 17 | 9.1 | 3.13 | 0.014 |
| 3rd symbol, U = 204 | 256 | 204 | 256 | 7 | 0 | 11.91 | 5 | N/A |
| 802.11ag 1st symbol | 64 | 12 | 16 | 5 | 0 | 7.78 | 8.1 | N/A |
| 802.16e DL 1st Symbol | 256 | 100 | 128 | 7 | 0 | 11.65 | 2.98 | N/A |
| 802.16e DL 2nd Symbol | 256 | 50 | 64 | 7 | 0 | 11.1 | 3.01 | N/A |

TABLE III

Values of $C_{k(u)}$ for n = 256 $\alpha = 1$ and U = 204

| u | k(u) | Real part of $C_{k(u)}$ | Imag part of $C_{k(u)}$ |
|---|---|---|---|
| 0 | 1 | −0.707106781 | −0.707106781 |
| 1 | 2 | 0.707106781 | −0.707106781 |
| 2 | 3 | −0.707106781 | 0.707106781 |
| 3 | 4 | 0.707106781 | −0.707106781 |
| 4 | 5 | −0.707106781 | 0.707106781 |
| 5 | 6 | −0.707106781 | 0.707106781 |
| 6 | 7 | −0.707106781 | 0.707106781 |
| 7 | 8 | 0.707106781 | −0.707106781 |
| 8 | 9 | 0.707106781 | 0.707106781 |
| 9 | 10 | 0.707106781 | −0.707106781 |
| 10 | 11 | −0.707106781 | −0.707106781 |
| 11 | 12 | 0.707106781 | −0.707106781 |
| 12 | 13 | 0.707106781 | 0.707106781 |
| 13 | 14 | 0.707106781 | −0.707106781 |
| 14 | 15 | −0.707106781 | 0.707106781 |
| 15 | 16 | 0.707106781 | −0.707106781 |
| 16 | 17 | −0.707106781 | −0.707106781 |
| 17 | 18 | −0.707106781 | 0.707106781 |
| 18 | 19 | −0.707106781 | −0.707106781 |
| 19 | 20 | −0.707106781 | −0.707106781 |
| 20 | 21 | −0.707106781 | −0.707106781 |
| 21 | 22 | 0.707106781 | −0.707106781 |
| 22 | 23 | 0.707106781 | 0.707106781 |
| 23 | 24 | −0.707106781 | −0.707106781 |

TABLE III-continued

Values of $C_{k(u)}$ for n = 256 α = 1 and U = 204

| u | k(u) | Real part of $C_{k(u)}$ | Imag part of $C_{k(u)}$ |
|---|------|-------------------------|-------------------------|
| 24 | 25 | 0.707106781 | 0.707106781 |
| 25 | 26 | −0.707106781 | −0.707106781 |
| 26 | 27 | 0.707106781 | −0.707106781 |
| 27 | 28 | 0.707106781 | 0.707106781 |
| 28 | 29 | −0.707106781 | 0.707106781 |
| 29 | 30 | −0.707106781 | 0.707106781 |
| 30 | 31 | −0.707106781 | −0.707106781 |
| 31 | 32 | −0.707106781 | −0.707106781 |
| 32 | 33 | 0.707106781 | 0.707106781 |
| 33 | 34 | 0.707106781 | −0.707106781 |
| 34 | 35 | 0.707106781 | −0.707106781 |
| 35 | 36 | 0.707106781 | −0.707106781 |
| 36 | 37 | 0.707106781 | −0.707106781 |
| 37 | 38 | 0.707106781 | −0.707106781 |
| 38 | 39 | 0.707106781 | −0.707106781 |
| 39 | 40 | 0.707106781 | 0.707106781 |
| 40 | 41 | 0.707106781 | −0.707106781 |
| 41 | 42 | 0.707106781 | −0.707106781 |
| 42 | 43 | 0.707106781 | 0.707106781 |
| 43 | 44 | −0.707106781 | −0.707106781 |
| 44 | 45 | −0.707106781 | 0.707106781 |
| 45 | 46 | −0.707106781 | 0.707106781 |
| 46 | 47 | −0.707106781 | −0.707106781 |
| 47 | 48 | 0.707106781 | −0.707106781 |
| 48 | 49 | 0.707106781 | 0.707106781 |
| 49 | 50 | −0.707106781 | −0.707106781 |
| 50 | 51 | −0.707106781 | 0.707106781 |
| 51 | 52 | −0.707106781 | 0.707106781 |
| 52 | 53 | 0.707106781 | 0.707106781 |
| 53 | 54 | −0.707106781 | 0.707106781 |
| 54 | 55 | −0.707106781 | −0.707106781 |
| 55 | 56 | −0.707106781 | 0.707106781 |
| 56 | 57 | −0.707106781 | 0.707106781 |
| 57 | 58 | −0.707106781 | −0.707106781 |
| 58 | 59 | −0.707106781 | 0.707106781 |
| 59 | 60 | 0.707106781 | −0.707106781 |
| 60 | 61 | −0.707106781 | 0.707106781 |
| 61 | 62 | 0.707106781 | 0.707106781 |
| 62 | 63 | 0.707106781 | −0.707106781 |
| 63 | 64 | −0.707106781 | −0.707106781 |
| 64 | 65 | 0.707106781 | −0.707106781 |
| 65 | 66 | 0.707106781 | −0.707106781 |
| 66 | 67 | 0.707106781 | 0.707106781 |
| 67 | 68 | −0.707106781 | 0.707106781 |
| 68 | 69 | 0.707106781 | −0.707106781 |
| 69 | 70 | −0.707106781 | 0.707106781 |
| 70 | 71 | −0.707106781 | −0.707106781 |
| 71 | 72 | 0.707106781 | 0.707106781 |
| 72 | 73 | −0.707106781 | 0.707106781 |
| 73 | 74 | 0.707106781 | −0.707106781 |
| 74 | 75 | −0.707106781 | 0.707106781 |
| 75 | 76 | 0.707106781 | 0.707106781 |
| 76 | 77 | 0.707106781 | 0.707106781 |
| 77 | 78 | 0.707106781 | 0.707106781 |
| 78 | 79 | 0.707106781 | 0.707106781 |
| 79 | 80 | 0.707106781 | −0.707106781 |
| 80 | 81 | −0.707106781 | −0.707106781 |
| 81 | 82 | −0.707106781 | −0.707106781 |
| 82 | 83 | 0.707106781 | −0.707106781 |
| 83 | 84 | 0.707106781 | 0.707106781 |
| 84 | 85 | −0.707106781 | 0.707106781 |
| 85 | 86 | 0.707106781 | 0.707106781 |
| 86 | 87 | 0.707106781 | 0.707106781 |
| 87 | 88 | 0.707106781 | −0.707106781 |
| 88 | 89 | −0.707106781 | −0.707106781 |
| 89 | 90 | −0.707106781 | −0.707106781 |
| 90 | 91 | −0.707106781 | −0.707106781 |
| 91 | 92 | −0.707106781 | 0.707106781 |
| 92 | 93 | 0.707106781 | −0.707106781 |
| 93 | 94 | 0.707106781 | −0.707106781 |
| 94 | 95 | −0.707106781 | −0.707106781 |
| 95 | 96 | 0.707106781 | 0.707106781 |
| 96 | 97 | −0.707106781 | 0.707106781 |
| 97 | 98 | 0.707106781 | −0.707106781 |
| 98 | 99 | −0.707106781 | −0.707106781 |
| 99 | 100 | 0.707106781 | 0.707106781 |
| 100 | 101 | 0.707106781 | −0.707106781 |
| 101 | 102 | −0.707106781 | −0.707106781 |
| 102 | −102 | 0.70710678 | 0.70710678 |
| 103 | −101 | 0.70710678 | −0.70710678 |
| 104 | −100 | 0.70710678 | −0.70710678 |
| 105 | −99 | −0.70710678 | 0.70710678 |
| 106 | −98 | −0.70710678 | −0.70710678 |
| 107 | −97 | 0.70710678 | −0.70710678 |
| 108 | −96 | −0.70710678 | −0.70710678 |
| 109 | −95 | −0.70710678 | 0.70710678 |
| 110 | −94 | −0.70710678 | −0.70710678 |
| 111 | −93 | 0.70710678 | 0.70710678 |
| 112 | −92 | 0.70710678 | 0.70710678 |
| 113 | −91 | 0.70710678 | 0.70710678 |
| 114 | −90 | 0.70710678 | 0.70710678 |
| 115 | −89 | 0.70710678 | −0.70710678 |
| 116 | −88 | −0.70710678 | 0.70710678 |
| 117 | −87 | 0.70710678 | 0.70710678 |
| 118 | −86 | −0.70710678 | 0.70710678 |
| 119 | −85 | 0.70710678 | 0.70710678 |
| 120 | −84 | −0.70710678 | −0.70710678 |
| 121 | −83 | −0.70710678 | 0.70710678 |
| 122 | −82 | −0.70710678 | −0.70710678 |
| 123 | −81 | −0.70710678 | 0.70710678 |
| 124 | −80 | 0.70710678 | 0.70710678 |
| 125 | −79 | 0.70710678 | 0.70710678 |
| 126 | −78 | −0.70710678 | −0.70710678 |
| 127 | −77 | −0.70710678 | −0.70710678 |
| 128 | −76 | −0.70710678 | −0.70710678 |
| 129 | −75 | −0.70710678 | −0.70710678 |
| 130 | −74 | −0.70710678 | 0.70710678 |
| 131 | −73 | 0.70710678 | −0.70710678 |
| 132 | −72 | 0.70710678 | −0.70710678 |
| 133 | −71 | 0.70710678 | −0.70710678 |
| 134 | −70 | −0.70710678 | −0.70710678 |
| 135 | −69 | −0.70710678 | 0.70710678 |
| 136 | −68 | −0.70710678 | −0.70710678 |
| 137 | −67 | −0.70710678 | −0.70710678 |
| 138 | −66 | −0.70710678 | −0.70710678 |
| 139 | −65 | −0.70710678 | −0.70710678 |
| 140 | −64 | −0.70710678 | −0.70710678 |
| 141 | −63 | 0.70710678 | −0.70710678 |
| 142 | −62 | −0.70710678 | −0.70710678 |
| 143 | −61 | −0.70710678 | −0.70710678 |
| 144 | −60 | 0.70710678 | −0.70710678 |
| 145 | −59 | 0.70710678 | 0.70710678 |
| 146 | −58 | −0.70710678 | 0.70710678 |
| 147 | −57 | −0.70710678 | −0.70710678 |
| 148 | −56 | −0.70710678 | −0.70710678 |
| 149 | −55 | 0.70710678 | 0.70710678 |
| 150 | −54 | −0.70710678 | 0.70710678 |
| 151 | −53 | −0.70710678 | 0.70710678 |
| 152 | −52 | −0.70710678 | 0.70710678 |
| 153 | −51 | −0.707106781 | −0.707106781 |
| 154 | −50 | 0.707106781 | −0.707106781 |
| 155 | −49 | 0.707106781 | 0.707106781 |
| 156 | −48 | −0.707106781 | 0.707106781 |
| 157 | −47 | 0.707106781 | −0.707106781 |
| 158 | −46 | −0.707106781 | −0.707106781 |
| 159 | −45 | 0.707106781 | 0.707106781 |
| 160 | −44 | 0.707106781 | −0.707106781 |
| 161 | −43 | −0.707106781 | 0.707106781 |
| 162 | −42 | 0.707106781 | −0.707106781 |
| 163 | −41 | −0.707106781 | 0.707106781 |
| 164 | −40 | 0.707106781 | −0.707106781 |
| 165 | −39 | 0.707106781 | 0.707106781 |
| 166 | −38 | 0.707106781 | −0.707106781 |
| 167 | −37 | 0.707106781 | 0.707106781 |
| 168 | −36 | −0.707106781 | 0.707106781 |
| 169 | −35 | −0.707106781 | 0.707106781 |
| 170 | −34 | 0.707106781 | 0.707106781 |
| 171 | −33 | −0.707106781 | 0.707106781 |
| 172 | −32 | −0.707106781 | −0.707106781 |
| 173 | −31 | 0.707106781 | −0.707106781 |

TABLE III-continued

Values of $C_{k(u)}$ for n = 256 α = 1 and U = 204

| u | k(u) | Real part of $C_{k(u)}$ | Imag part of $C_{k(u)}$ |
|---|------|------------------------|-------------------------|
| 174 | −30 | −0.707106781 | −0.707106781 |
| 175 | −29 | 0.707106781 | 0.707106781 |
| 176 | −28 | −0.707106781 | −0.707106781 |
| 177 | −27 | 0.707106781 | 0.707106781 |
| 178 | −26 | 0.707106781 | 0.707106781 |
| 179 | −25 | −0.707106781 | 0.707106781 |
| 180 | −24 | −0.707106781 | 0.707106781 |
| 181 | −23 | −0.707106781 | −0.707106781 |
| 182 | −22 | −0.707106781 | −0.707106781 |
| 183 | −21 | 0.707106781 | −0.707106781 |
| 184 | −20 | −0.707106781 | −0.707106781 |
| 185 | −19 | 0.707106781 | 0.707106781 |
| 186 | −18 | −0.707106781 | 0.707106781 |
| 187 | −17 | −0.707106781 | 0.707106781 |
| 188 | −16 | −0.707106781 | −0.707106781 |
| 189 | −15 | −0.707106781 | −0.707106781 |
| 190 | −14 | −0.707106781 | 0.707106781 |
| 191 | −13 | −0.707106781 | 0.707106781 |
| 192 | −12 | 0.707106781 | 0.707106781 |
| 193 | −11 | −0.707106781 | 0.707106781 |
| 194 | −10 | −0.707106781 | 0.707106781 |
| 195 | −9 | 0.707106781 | 0.707106781 |
| 196 | −8 | 0.707106781 | 0.707106781 |
| 197 | −7 | −0.707106781 | −0.707106781 |
| 198 | −6 | 0.707106781 | 0.707106781 |
| 199 | −5 | −0.707106781 | −0.707106781 |
| 200 | −4 | −0.707106781 | 0.707106781 |
| 201 | −3 | −0.707106781 | −0.707106781 |
| 202 | −2 | −0.707106781 | 0.707106781 |
| 203 | −1 | 0.707106781 | −0.707106781 |

TABLE IV

Values for $S_{k(u)}$ for n = 256 α = 1 and U = 204

| u | k(u) | Real part of $C_{k(u)}$ | Imag part of $C_{k(u)}$ |
|---|------|------------------------|-------------------------|
| 0 | 1 | −1.249226658 | 0.984532088 |
| 1 | 2 | 1.34234257 | −0.824204614 |
| 2 | 3 | −0.916966774 | 1.251714954 |
| 3 | 4 | 0.365432918 | 1.478357117 |
| 4 | 5 | 0.658871497 | −1.338999666 |
| 5 | 6 | 1.438449344 | −0.270875123 |
| 6 | 7 | 0.533665265 | 1.337750232 |
| 7 | 8 | −0.368993318 | −1.375438718 |
| 8 | 9 | 1.166697747 | −0.802119591 |
| 9 | 10 | −1.410121771 | 0.113721519 |
| 10 | 11 | −0.56013175 | −1.303338105 |
| 11 | 12 | 0.596145066 | 1.294071114 |
| 12 | 13 | 1.429826204 | −0.041152429 |
| 13 | 14 | −0.67829606 | 1.262489378 |
| 14 | 15 | −0.029984472 | 1.431211917 |
| 15 | 16 | −1.399391135 | 0.268917812 |
| 16 | 17 | −0.399003639 | −1.356579858 |
| 17 | 18 | −1.109131656 | −0.854151827 |
| 18 | 19 | −0.565462715 | 1.263562485 |
| 19 | 20 | 1.277326185 | −0.492735428 |
| 20 | 21 | −1.108368729 | −0.780595384 |
| 21 | 22 | 1.343618726 | −0.060153123 |
| 22 | 23 | 0.380738448 | 1.281729355 |
| 23 | 24 | −1.321214624 | 0.164077831 |
| 24 | 25 | 1.32432103 | −0.078037964 |
| 25 | 26 | 1.241680951 | −0.452151554 |
| 26 | 27 | 1.313006033 | −0.063879986 |
| 27 | 28 | 0.472860949 | 1.216409931 |
| 28 | 29 | 0.463171734 | −1.206888592 |
| 29 | 30 | 0.016573228 | 1.27762121 |
| 30 | 31 | −1.260581159 | −0.029550731 |
| 31 | 32 | −1.137750962 | 0.501598193 |
| 32 | 33 | −1.223791717 | −0.07898513 |
| 33 | 34 | −0.679260765 | 1.002106696 |

TABLE IV-continued

Values for $S_{k(u)}$ for n = 256 α = 1 and U = 204

| u | k(u) | Real part of $C_{k(u)}$ | Imag part of $C_{k(u)}$ |
|---|------|------------------------|-------------------------|
| 34 | 35 | −0.446506653 | −1.110345348 |
| 35 | 36 | −0.96994257 | −0.680214406 |
| 36 | 37 | −0.058965728 | 1.172356473 |
| 37 | 38 | −1.155734604 | −0.132573951 |
| 38 | 39 | −0.028726442 | 1.151745981 |
| 39 | 40 | −1.136694305 | −0.0777623 |
| 40 | 41 | 0.798607784 | −0.791719081 |
| 41 | 42 | 0.192067502 | 1.090837355 |
| 42 | 43 | 0.426702106 | −1.001895494 |
| 43 | 44 | −0.516121202 | 0.936572387 |
| 44 | 45 | 0.291650767 | 1.008382113 |
| 45 | 46 | 0.676475901 | 0.777857103 |
| 46 | 47 | 0.906877345 | 0.45229867 |
| 47 | 48 | 0.623240457 | −0.778847914 |
| 48 | 49 | −0.97939411 | 0.082732686 |
| 49 | 50 | 0.955133139 | −0.162520801 |
| 50 | 51 | 0.764799547 | 0.571287706 |
| 51 | 52 | 0.888588181 | −0.304609382 |
| 52 | 53 | −0.10021742 | 0.917063634 |
| 53 | 54 | −0.05989417 | 0.901995646 |
| 54 | 55 | 0.788591284 | −0.399456175 |
| 55 | 56 | −0.84285014 | 0.186210676 |
| 56 | 57 | 0.794892833 | −0.278740643 |
| 57 | 58 | −0.52414496 | −0.633609875 |
| 58 | 59 | −0.12762195 | −0.793403022 |
| 59 | 60 | 0.145419267 | 0.772813476 |
| 60 | 61 | 0.004382175 | 0.770310909 |
| 61 | 62 | 0.754769707 | −0.002375691 |
| 62 | 63 | −0.28570034 | −0.68142378 |
| 63 | 64 | −0.65388085 | −0.30598984 |
| 64 | 65 | −0.5005574 | 0.494270333 |
| 65 | 66 | −0.48852194 | −0.478036467 |
| 66 | 67 | 0.647054768 | 0.1424309 |
| 67 | 68 | −0.59514936 | −0.239320357 |
| 68 | 69 | 0.546551313 | −0.295354439 |
| 69 | 70 | 0.542412289 | −0.262769059 |
| 70 | 71 | 0.397641609 | −0.430656096 |
| 71 | 72 | 0.06671118 | 0.567355292 |
| 72 | 73 | 0.512451361 | −0.218440625 |
| 73 | 74 | −0.54086437 | −0.038832057 |
| 74 | 75 | 0.486929652 | 0.197800459 |
| 75 | 76 | 0.439013563 | 0.25204327 |
| 76 | 77 | −0.44334169 | −0.182933405 |
| 77 | 78 | 0.190496206 | 0.419369764 |
| 78 | 79 | −0.27209638 | −0.342351356 |
| 79 | 80 | 0.415419265 | −0.033829581 |
| 80 | 81 | −0.39991616 | −0.032360781 |
| 81 | 82 | −0.33853954 | −0.196501364 |
| 82 | 83 | 0.250039355 | 0.29433547 |
| 83 | 84 | 0.316955439 | −0.213788238 |
| 84 | 85 | −0.36536222 | 0.08656002 |
| 85 | 86 | 0.267345697 | −0.243290158 |
| 86 | 87 | 0.070150606 | −0.329869317 |
| 87 | 88 | 0.294324352 | −0.066533854 |
| 88 | 89 | −0.25306932 | −0.045129724 |
| 89 | 90 | 0.029265398 | 0.208401819 |
| 90 | 91 | −0.05909352 | −0.167830368 |
| 91 | 92 | −0.17121856 | −0.056691981 |
| 92 | 93 | −0.12627108 | 0.17707097 |
| 93 | 94 | −0.09621092 | 0.248071086 |
| 94 | 95 | −0.24827403 | 0.174779284 |
| 95 | 96 | −0.29771913 | 0.092494776 |
| 96 | 97 | 0.113344305 | 0.245355745 |
| 97 | 98 | −0.02151985 | −0.125148139 |
| 98 | 99 | 0.215726394 | 0.109819811 |
| 99 | 100 | −0.31761333 | 0.082921765 |
| 100 | 101 | 0.191603878 | −0.121811777 |
| 101 | 102 | −0.26944205 | −0.396828481 |
| 102 | −102 | 0.474954245 | 0.067009911 |
| 103 | −101 | 0.127932167 | 0.187572694 |
| 104 | −100 | −0.044057772 | −0.325289343 |
| 105 | −99 | −0.179381381 | 0.162544112 |
| 106 | −98 | 0.043148328 | 0.119429402 |
| 107 | −97 | 0.266653518 | −0.044071242 |
| 108 | −96 | −0.027927685 | 0.310502826 |

TABLE IV-continued

Values for $S_{k(u)}$ for n = 256 α = 1 and U = 204

| u | k(u) | Real part of $C_{k(u)}$ | Imag part of $C_{k(u)}$ |
|---|---|---|---|
| 109 | −95 | −0.071915228 | −0.294984733 |
| 110 | −94 | −0.122834477 | 0.236024356 |
| 111 | −93 | 0.216054551 | 0.024878586 |
| 112 | −92 | −0.041241175 | 0.175581725 |
| 113 | −91 | −0.177764331 | 0.007675876 |
| 114 | −90 | −0.167308262 | −0.127654718 |
| 115 | −89 | −0.219751742 | −0.133378953 |
| 116 | −88 | −0.145546828 | −0.26432877 |
| 117 | −87 | 0.193839276 | 0.275973203 |
| 118 | −86 | −0.340508395 | −0.121317167 |
| 119 | −85 | 0.089574095 | −0.364634986 |
| 120 | −84 | −0.03396008 | 0.38080556 |
| 121 | −83 | −0.092893679 | 0.374865059 |
| 122 | −82 | −0.341613572 | −0.19110723 |
| 123 | −81 | −0.029046715 | 0.40017052 |
| 124 | −80 | −0.377617722 | 0.176415596 |
| 125 | −79 | −0.433857676 | −0.054848978 |
| 126 | −78 | 0.39335448 | 0.239649863 |
| 127 | −77 | −0.295936481 | −0.383270794 |
| 128 | −76 | 0.501968679 | 0.065468795 |
| 129 | −75 | 0.223150802 | 0.475845802 |
| 130 | −74 | −0.53480507 | 0.089586447 |
| 131 | −73 | −0.248728214 | −0.498454592 |
| 132 | −72 | −0.484686837 | −0.302359188 |
| 133 | −71 | 0.22877099 | 0.53967338 |
| 134 | −70 | −0.059931097 | 0.59972238 |
| 135 | −69 | 0.003933953 | −0.621238365 |
| 136 | −68 | 0.640369119 | 0.037475129 |
| 137 | −67 | −0.617501721 | 0.240120926 |
| 138 | −66 | 0.678087039 | −0.085851701 |
| 139 | −65 | 0.156656991 | 0.685798411 |
| 140 | −64 | −0.419708791 | −0.587396361 |
| 141 | −63 | 0.414916326 | −0.611397785 |
| 142 | −62 | 0.419424079 | 0.627508085 |
| 143 | −61 | 0.676257373 | −0.368882184 |
| 144 | −60 | −0.286744036 | 0.732233084 |
| 145 | −59 | 0.176148159 | 0.78405838 |
| 146 | −58 | 0.472581735 | 0.672945699 |
| 147 | −57 | 0.736066673 | 0.409581267 |
| 148 | −56 | −0.066533299 | 0.860606815 |
| 149 | −55 | −0.85861476 | −0.210290615 |
| 150 | −54 | −0.816148443 | −0.388696766 |
| 151 | −53 | 0.609250114 | 0.692721833 |
| 152 | −52 | 0.426801223 | −0.836789428 |
| 153 | −51 | −0.954143236 | −0.029977914 |
| 154 | −50 | −0.692414421 | −0.677683255 |
| 155 | −49 | 0.921125323 | 0.342907655 |
| 156 | −48 | −0.996397748 | −0.047162143 |
| 157 | −47 | −0.811167938 | −0.607459614 |
| 158 | −46 | −0.326524686 | −0.977784714 |
| 159 | −45 | −0.377385093 | 0.979528023 |
| 160 | −44 | −1.058090047 | 0.154901211 |
| 161 | −43 | −0.992365685 | −0.448419019 |
| 162 | −42 | −1.043213093 | −0.372186112 |
| 163 | −41 | 0.571211914 | 0.968664258 |
| 164 | −40 | −0.297109706 | −1.099930335 |
| 165 | −39 | 0.879813828 | 0.743822318 |
| 166 | −38 | −0.33443207 | 1.11420533 |
| 167 | −37 | 0.99170248 | 0.628030929 |
| 168 | −36 | −0.918771041 | 0.747890367 |
| 169 | −35 | −0.504892042 | 1.085043322 |
| 170 | −34 | −0.756172462 | −0.945418544 |
| 171 | −33 | −0.509311989 | 1.115574343 |
| 172 | −32 | −0.540065849 | −1.12000307 |
| 173 | −31 | −0.485049209 | −1.163900927 |
| 174 | −30 | −1.06026272 | −0.713045294 |
| 175 | −29 | 0.554017783 | 1.167977921 |
| 176 | −28 | 0.742594211 | −1.073221522 |
| 177 | −27 | −0.060648926 | 1.313159245 |
| 178 | −26 | 1.127636188 | 0.688947922 |
| 179 | −25 | 0.257587528 | −1.301370347 |
| 180 | −24 | 1.251359458 | −0.454564763 |
| 181 | −23 | −0.981995149 | 0.907456573 |
| 182 | −22 | 1.063094807 | −0.823868382 |
| 183 | −21 | 1.218462134 | 0.594273019 |
| 184 | −20 | −0.768875904 | 1.132775454 |
| 185 | −19 | 0.020536438 | 1.384166352 |
| 186 | −18 | 1.291060271 | −0.541213223 |
| 187 | −17 | −0.082103268 | 1.411655718 |
| 188 | −16 | −0.856703173 | 1.13871507 |
| 189 | −15 | −1.386566273 | −0.355950266 |
| 190 | −14 | −0.232562628 | −1.414170994 |
| 191 | −13 | 0.570617007 | −1.311675542 |
| 192 | −12 | −0.954729167 | −1.057592173 |
| 193 | −11 | −1.293978356 | 0.581427389 |
| 194 | −10 | 0.066266825 | 1.413147091 |
| 195 | −9 | −0.997746938 | −1.004529999 |
| 196 | −8 | −1.391879779 | 0.301095361 |
| 197 | −7 | −1.265423997 | −0.687805499 |
| 198 | −6 | −1.455203248 | −0.157776275 |
| 199 | −5 | 0.906478085 | 1.185465832 |
| 200 | −4 | −1.457356714 | −0.44180583 |
| 201 | −3 | −0.399590916 | 1.499315007 |
| 202 | −2 | 1.244034898 | −0.966216328 |
| 203 | −1 | 0.021406419 | −1.590412664 |

TABLE V

Values of $S_{k(u)}$ for n = 256 α = 2 and U = 204

| u | k(u) | Real part of $C_{k(u)}$ | Imag part of $C_{k(u)}$ |
|---|---|---|---|
| 0 | 1 | 0 | 0 |
| 1 | 2 | −2.43480037 | 0.153762063 |
| 2 | 3 | 0 | 0 |
| 3 | 4 | 1.896044173 | 1.260945482 |
| 4 | 5 | 0 | 0 |
| 5 | 6 | −1.837637932 | 0.990724198 |
| 6 | 7 | 0 | 0 |
| 7 | 8 | −0.547935251 | −1.882625437 |
| 8 | 9 | 0 | 0 |
| 9 | 10 | −0.29887645 | −1.919446863 |
| 10 | 11 | 0 | 0 |
| 11 | 12 | 0.015918336 | 1.998018419 |
| 12 | 13 | 0 | 0 |
| 13 | 14 | 1.881708488 | 0.817892047 |
| 14 | 15 | 0 | 0 |
| 15 | 16 | −1.011600019 | 1.785727327 |
| 16 | 17 | 0 | 0 |
| 17 | 18 | 0.820258715 | −1.82120569 |
| 18 | 19 | 0 | 0 |
| 19 | 20 | 1.86550034 | 0.467504758 |
| 20 | 21 | 0 | 0 |
| 21 | 22 | 0.151005439 | −1.867851857 |
| 22 | 23 | 0 | 0 |
| 23 | 24 | −1.067351223 | 1.530384066 |
| 24 | 25 | 0 | 0 |
| 25 | 26 | −1.527887267 | −1.088608485 |
| 26 | 27 | 0 | 0 |
| 27 | 28 | 1.50371047 | −1.108803589 |
| 28 | 29 | 0 | 0 |
| 29 | 30 | −0.502066211 | −1.75417773 |
| 30 | 31 | 0 | 0 |
| 31 | 32 | 1.687613418 | 0.487065393 |
| 32 | 33 | 0 | 0 |
| 33 | 34 | 1.583365073 | −0.601106509 |
| 34 | 35 | 0 | 0 |
| 35 | 36 | 1.614424541 | 0.377879054 |
| 36 | 37 | 0 | 0 |
| 37 | 38 | −1.158313007 | 1.167353214 |
| 38 | 39 | 0 | 0 |
| 39 | 40 | 1.334703891 | 0.930597428 |
| 40 | 41 | 0 | 0 |
| 41 | 42 | 1.471555658 | 0.5867829 |
| 42 | 43 | 0 | 0 |
| 43 | 44 | −0.208936518 | 1.501881311 |

TABLE V-continued

Values of $S_{k(u)}$ for n = 256 α = 2 and U = 204

| u | k(u) | Real part of $C_{k(u)}$ | Imag part of $C_{k(u)}$ |
|---|---|---|---|
| 44 | 45 | 0 | 0 |
| 45 | 46 | 1.012305522 | 1.030603449 |
| 46 | 47 | 0 | 0 |
| 47 | 48 | 0.626073135 | −1.243918163 |
| 48 | 49 | 0 | 0 |
| 49 | 50 | −0.593646334 | −1.228203515 |
| 50 | 51 | 0 | 0 |
| 51 | 52 | −0.808589639 | 1.068521635 |
| 52 | 53 | 0 | 0 |
| 53 | 54 | −1.120419528 | 0.653371535 |
| 54 | 55 | 0 | 0 |
| 55 | 56 | −1.223494011 | 0.118828897 |
| 56 | 57 | 0 | 0 |
| 57 | 58 | −0.298116861 | 1.113596003 |
| 58 | 59 | 0 | 0 |
| 59 | 60 | −0.834996208 | −0.704042885 |
| 60 | 61 | 0 | 0 |
| 61 | 62 | 0.419672577 | −0.969766278 |
| 62 | 63 | 0 | 0 |
| 63 | 64 | 0.996006618 | 0.262536787 |
| 64 | 65 | 0 | 0 |
| 65 | 66 | −0.83023483 | −0.534648368 |
| 66 | 67 | 0 | 0 |
| 67 | 68 | −0.318009689 | −0.863323464 |
| 68 | 69 | 0 | 0 |
| 69 | 70 | 0.119816938 | 0.834510382 |
| 70 | 71 | 0 | 0 |
| 71 | 72 | −0.687863326 | −0.375248033 |
| 72 | 73 | 0 | 0 |
| 73 | 74 | −0.02121135 | 0.751164122 |
| 74 | 75 | 0 | 0 |
| 75 | 76 | 0.529060434 | 0.49710691 |
| 76 | 77 | 0 | 0 |
| 77 | 78 | −0.585030742 | −0.3446326 |
| 78 | 79 | 0 | 0 |
| 79 | 80 | 0.344698558 | 0.499195194 |
| 80 | 81 | 0 | 0 |
| 81 | 82 | 0.470646002 | 0.260129064 |
| 82 | 83 | 0 | 0 |
| 83 | 84 | 0.347385696 | 0.367447536 |
| 84 | 85 | 0 | 0 |
| 85 | 86 | 0.425567674 | −0.254033742 |
| 86 | 87 | 0 | 0 |
| 87 | 88 | −0.371381785 | −0.259640249 |
| 88 | 89 | 0 | 0 |
| 89 | 90 | −0.020387076 | 0.350217839 |
| 90 | 91 | 0 | 0 |
| 91 | 92 | −0.064769884 | 0.249221688 |
| 92 | 93 | 0 | 0 |
| 93 | 94 | 0.32303062 | −0.028998848 |
| 94 | 95 | 0 | 0 |
| 95 | 96 | 0.398258368 | −0.123388256 |
| 96 | 97 | 0 | 0 |
| 97 | 98 | 0.221538141 | 0.147644221 |
| 98 | 99 | 0 | 0 |
| 99 | 100 | 0.10886564 | −0.432767869 |
| 100 | 101 | 0 | 0 |
| 101 | 102 | 0.446704694 | 0.108444411 |
| 102 | −102 | −0.274543454 | 0.36868844 |
| 103 | −101 | 0 | 0 |
| 104 | −100 | −0.074065821 | 0.440061371 |
| 105 | −99 | 0 | 0 |
| 106 | −98 | −0.262263022 | 0.045782871 |
| 107 | −97 | 0 | 0 |
| 108 | −96 | −0.335007702 | 0.248201992 |
| 109 | −95 | 0 | 0 |
| 110 | −94 | −0.018993877 | 0.323772987 |
| 111 | −93 | 0 | 0 |
| 112 | −92 | 0.22974254 | −0.11629683 |
| 113 | −91 | 0 | 0 |
| 114 | −90 | 0.016080833 | 0.35044197 |
| 115 | −89 | 0 | 0 |
| 116 | −88 | 0.340791036 | −0.298661948 |
| 117 | −87 | 0 | 0 |
| 118 | −86 | 0.453726248 | −0.199432894 |
| 119 | −85 | 0 | 0 |
| 120 | −84 | 0.490604592 | 0.122481213 |
| 121 | −83 | 0 | 0 |
| 122 | −82 | −0.328085607 | 0.426068801 |
| 123 | −81 | 0 | 0 |
| 124 | −80 | 0.206109446 | 0.570553971 |
| 125 | −79 | 0 | 0 |
| 126 | −78 | 0.330923657 | 0.592893019 |
| 127 | −77 | 0 | 0 |
| 128 | −76 | −0.703711807 | −0.178353346 |
| 129 | −75 | 0 | 0 |
| 130 | −74 | −0.336320155 | 0.672001646 |
| 131 | −73 | 0 | 0 |
| 132 | −72 | −0.464140399 | 0.631300825 |
| 133 | −71 | 0 | 0 |
| 134 | −70 | 0.090798123 | 0.83816429 |
| 135 | −69 | 0 | 0 |
| 136 | −68 | −0.28017439 | 0.8763332 |
| 137 | −67 | 0 | 0 |
| 138 | −66 | 0.777003318 | −0.609429728 |
| 139 | −65 | 0 | 0 |
| 140 | −64 | 0.578462395 | 0.852253487 |
| 141 | −63 | 0 | 0 |
| 142 | −62 | 0.523821168 | −0.917705339 |
| 143 | −61 | 0 | 0 |
| 144 | −60 | −0.31612641 | 1.045446863 |
| 145 | −59 | 0 | 0 |
| 146 | −58 | 0.48382755 | −1.046365435 |
| 147 | −57 | 0 | 0 |
| 148 | −56 | 1.109744141 | 0.528702037 |
| 149 | −55 | 0 | 0 |
| 150 | −54 | 0.270657507 | 1.26845528 |
| 151 | −53 | 0 | 0 |
| 152 | −52 | −0.90009108 | −0.992668997 |
| 153 | −51 | 0 | 0 |
| 154 | −50 | −0.488973663 | −1.273500923 |
| 155 | −49 | 0 | 0 |
| 156 | −48 | −0.423626921 | 1.326589687 |
| 157 | −47 | 0 | 0 |
| 158 | −46 | 1.138586585 | −0.889115587 |
| 159 | −45 | 0 | 0 |
| 160 | −44 | −1.505223658 | 0.183313067 |
| 161 | −43 | 0 | 0 |
| 162 | −42 | 0.21486903 | −1.56959279 |
| 163 | −41 | 0 | 0 |
| 164 | −40 | 1.115005719 | −1.184992952 |
| 165 | −39 | 0 | 0 |
| 166 | −38 | 1.488585347 | −0.698939348 |
| 167 | −37 | 0 | 0 |
| 168 | −36 | 1.056970921 | −1.277486458 |
| 169 | −35 | 0 | 0 |
| 170 | −34 | −1.495127053 | 0.795593542 |
| 171 | −33 | 0 | 0 |
| 172 | −32 | −1.380695043 | 1.085795996 |
| 173 | −31 | 0 | 0 |
| 174 | −30 | −1.098140656 | 1.457153762 |
| 175 | −29 | 0 | 0 |
| 176 | −28 | −0.273558715 | −1.848176455 |
| 177 | −27 | 0 | 0 |
| 178 | −26 | −1.853219664 | −0.291693013 |
| 179 | −25 | 0 | 0 |
| 180 | −24 | 1.723198017 | 0.715473702 |
| 181 | −23 | 0 | 0 |
| 182 | −22 | 1.73935864 | −0.697355523 |
| 183 | −21 | 0 | 0 |
| 184 | −20 | −1.347581697 | −1.372106332 |
| 185 | −19 | 0 | 0 |
| 186 | −18 | −1.635456167 | 1.146689866 |
| 187 | −17 | 0 | 0 |
| 188 | −16 | 1.646168436 | 1.225677839 |
| 189 | −15 | 0 | 0 |
| 190 | −14 | 1.967332734 | −0.582559995 |
| 191 | −13 | 0 | 0 |
| 192 | −12 | 1.986257034 | −0.217057571 |
| 193 | −11 | 0 | 0 |

TABLE V-continued

Values of $S_{k(u)}$ for n = 256 α = 2 and U = 204

| u | k(u) | Real part of $C_{k(u)}$ | Imag part of $C_{k(u)}$ |
|---|---|---|---|
| 194 | −10 | 0.05820588 | −1.941704269 |
| 195 | −9 | 0 | 0 |
| 196 | −8 | −1.306986646 | 1.461607842 |
| 197 | −7 | 0 | 0 |
| 198 | −6 | 1.78953218 | 1.07518472 |
| 199 | −5 | 0 | 0 |
| 200 | −4 | 0.128503989 | −2.273423353 |
| 201 | −3 | 0 | 0 |
| 202 | −2 | 1.478049055 | −1.940944771 |
| 203 | −1 | 0 | 0 |

TABLE VI

| u | k(u) | Real part of $C_{k(u)}$ | Imag part of $C_{k(u)}$ |
|---|---|---|---|
| 0 | 1 | 0 | 0 |
| 1 | 2 | 0 | 0 |
| 2 | 3 | 0 | 0 |
| 3 | 4 | 9.45E−05 | −3.913294166 |
| 4 | 5 | 0 | 0 |
| 5 | 6 | 0 | 0 |
| 6 | 7 | 0 | 0 |
| 7 | 8 | 2.349493853 | 0.587036193 |
| 8 | 9 | 0 | 0 |
| 9 | 10 | 0 | 0 |
| 10 | 11 | 0 | 0 |
| 11 | 12 | 0.25730963 | 2.68801568 |
| 12 | 13 | 0 | 0 |
| 13 | 14 | 0 | 0 |
| 14 | 15 | 0 | 0 |
| 15 | 16 | 2.771722054 | −1.449189001 |
| 16 | 17 | 0 | 0 |
| 17 | 18 | 0 | 0 |
| 18 | 19 | 0 | 0 |
| 19 | 20 | −2.355713657 | 1.221335601 |
| 20 | 21 | 0 | 0 |
| 21 | 22 | 0 | 0 |
| 22 | 23 | 0 | 0 |
| 23 | 24 | 0.181420571 | 2.507093518 |
| 24 | 25 | 0 | 0 |
| 25 | 26 | 0 | 0 |
| 26 | 27 | 0 | 0 |
| 27 | 28 | −2.607638884 | −0.949076342 |
| 28 | 29 | 0 | 0 |
| 29 | 30 | 0 | 0 |
| 30 | 31 | 0 | 0 |
| 31 | 32 | 1.833386595 | 1.688499107 |
| 32 | 33 | 0 | 0 |
| 33 | 34 | 0 | 0 |
| 34 | 35 | 0 | 0 |
| 35 | 36 | −1.023228221 | −1.970227148 |
| 36 | 37 | 0 | 0 |
| 37 | 38 | 0 | 0 |
| 38 | 39 | 0 | 0 |
| 39 | 40 | 2.273624944 | −0.714624765 |
| 40 | 41 | 0 | 0 |
| 41 | 42 | 0 | 0 |
| 42 | 43 | 0 | 0 |
| 43 | 44 | 1.108961407 | 1.893217116 |
| 44 | 45 | 0 | 0 |
| 45 | 46 | 0 | 0 |
| 46 | 47 | 0 | 0 |
| 47 | 48 | 1.843479023 | 0.037247068 |
| 48 | 49 | 0 | 0 |
| 49 | 50 | 0 | 0 |
| 50 | 51 | 0 | 0 |
| 51 | 52 | 1.283089344 | 1.452608779 |
| 52 | 53 | 0 | 0 |
| 53 | 54 | 0 | 0 |
| 54 | 55 | 0 | 0 |
| 55 | 56 | 1.29447444 | −1.279868358 |

TABLE VI-continued

| u | k(u) | Real part of $C_{k(u)}$ | Imag part of $C_{k(u)}$ |
|---|---|---|---|
| 56 | 57 | 0 | 0 |
| 57 | 58 | 0 | 0 |
| 58 | 59 | 0 | 0 |
| 59 | 60 | 1.319339868 | 0.509538169 |
| 60 | 61 | 0 | 0 |
| 61 | 62 | 0 | 0 |
| 62 | 63 | 0 | 0 |
| 63 | 64 | 1.013661304 | −1.055332416 |
| 64 | 65 | 0 | 0 |
| 65 | 66 | 0 | 0 |
| 66 | 67 | 0 | 0 |
| 67 | 68 | 0.457650107 | 1.342087679 |
| 68 | 69 | 0 | 0 |
| 69 | 70 | 0 | 0 |
| 70 | 71 | 0 | 0 |
| 71 | 72 | −0.94273949 | −0.175122345 |
| 72 | 73 | 0 | 0 |
| 73 | 74 | 0 | 0 |
| 74 | 75 | 0 | 0 |
| 75 | 76 | 0.995205695 | 0.023256247 |
| 76 | 77 | 0 | 0 |
| 77 | 78 | 0 | 0 |
| 78 | 79 | 0 | 0 |
| 79 | 80 | 0.808011809 | 0.640711198 |
| 80 | 81 | 0 | 0 |
| 81 | 82 | 0 | 0 |
| 82 | 83 | 0 | 0 |
| 83 | 84 | 0.190854252 | −0.437093534 |
| 84 | 85 | 0 | 0 |
| 85 | 86 | 0 | 0 |
| 86 | 87 | 0 | 0 |
| 87 | 88 | −0.31933541 | 0.49166784 |
| 88 | 89 | 0 | 0 |
| 89 | 90 | 0 | 0 |
| 90 | 91 | 0 | 0 |
| 91 | 92 | −0.60415739 | 0.364083586 |
| 92 | 93 | 0 | 0 |
| 93 | 94 | 0 | 0 |
| 94 | 95 | 0 | 0 |
| 95 | 96 | 0.155356328 | −0.367608093 |
| 96 | 97 | 0 | 0 |
| 97 | 98 | 0 | 0 |
| 98 | 99 | 0 | 0 |
| 99 | 100 | −0.45952476 | 0.129785257 |
| 100 | 101 | 0 | 0 |
| 101 | 102 | 0 | 0 |
| 102 | −102 | 0 | 0 |
| 103 | −101 | 0 | 0 |
| 104 | −100 | −0.467894126 | 0.095301109 |
| 105 | −99 | 0 | 0 |
| 106 | −98 | 0 | 0 |
| 107 | −97 | 0 | 0 |
| 108 | −96 | −0.195839163 | −0.347733117 |
| 109 | −95 | 0 | 0 |
| 110 | −94 | 0 | 0 |
| 111 | −93 | 0 | 0 |
| 112 | −92 | 0.578321794 | −0.403864974 |
| 113 | −91 | 0 | 0 |
| 114 | −90 | 0 | 0 |
| 115 | −89 | 0 | 0 |
| 116 | −88 | 0.44451831 | −0.382251015 |
| 117 | −87 | 0 | 0 |
| 118 | −86 | 0 | 0 |
| 119 | −85 | 0 | 0 |
| 120 | −84 | 0.35731909 | −0.315910068 |
| 121 | −83 | 0 | 0 |
| 122 | −82 | 0 | 0 |
| 123 | −81 | 0 | 0 |
| 124 | −80 | −0.915308866 | 0.474977474 |
| 125 | −79 | 0 | 0 |
| 126 | −78 | 0 | 0 |
| 127 | −77 | 0 | 0 |
| 128 | −76 | 0.477732194 | −0.873353983 |
| 129 | −75 | 0 | 0 |
| 130 | −74 | 0 | 0 |
| 131 | −73 | 0 | 0 |
| 132 | −72 | −0.132430396 | 0.949677723 |

TABLE VI-continued

| u | k(u) | Real part of $C_{k(u)}$ | Imag part of $C_{k(u)}$ |
|---|---|---|---|
| 133 | −71 | 0 | 0 |
| 134 | −70 | 0 | 0 |
| 135 | −69 | 0 | 0 |
| 136 | −68 | −0.054933602 | 1.416906934 |
| 137 | −67 | 0 | 0 |
| 138 | −66 | 0 | 0 |
| 139 | −65 | 0 | 0 |
| 140 | −64 | −0.315755303 | 1.42882271 |
| 141 | −63 | 0 | 0 |
| 142 | −62 | 0 | 0 |
| 143 | −61 | 0 | 0 |
| 144 | −60 | −0.253382152 | −1.39143247 |
| 145 | −59 | 0 | 0 |
| 146 | −58 | 0 | 0 |
| 147 | −57 | 0 | 0 |
| 148 | −56 | 0.70159115 | −1.679731213 |
| 149 | −55 | 0 | 0 |
| 150 | −54 | 0 | 0 |
| 151 | −53 | 0 | 0 |
| 152 | −52 | 1.880614957 | 0.468698103 |
| 153 | −51 | 0 | 0 |
| 154 | −50 | 0 | 0 |
| 155 | −49 | 0 | 0 |
| 156 | −48 | 0.338863583 | −1.812449647 |
| 157 | −47 | 0 | 0 |
| 158 | −46 | 0 | 0 |
| 159 | −45 | 0 | 0 |
| 160 | −44 | −1.253636083 | 1.800684042 |
| 161 | −43 | 0 | 0 |
| 162 | −42 | 0 | 0 |
| 163 | −41 | 0 | 0 |
| 164 | −40 | −1.541757921 | −1.817427153 |
| 165 | −39 | 0 | 0 |
| 166 | −38 | 0 | 0 |
| 167 | −37 | 0 | 0 |
| 168 | −36 | 1.268617805 | −1.821922027 |
| 169 | −35 | 0 | 0 |
| 170 | −34 | 0 | 0 |
| 171 | −33 | 0 | 0 |
| 172 | −32 | 0.22844119 | 2.481965001 |
| 173 | −31 | 0 | 0 |
| 174 | −30 | 0 | 0 |
| 175 | −29 | 0 | 0 |
| 176 | −28 | −2.774073833 | −0.070998751 |
| 177 | −27 | 0 | 0 |
| 178 | −26 | 0 | 0 |
| 179 | −25 | 0 | 0 |
| 180 | −24 | −1.43993061 | −2.060347342 |
| 181 | −23 | 0 | 0 |
| 182 | −22 | 0 | 0 |
| 183 | −21 | 0 | 0 |
| 184 | −20 | −0.818362038 | −2.524149572 |
| 185 | −19 | 0 | 0 |
| 186 | −18 | 0 | 0 |
| 187 | −17 | 0 | 0 |
| 188 | −16 | −2.095034458 | −2.32237433 |
| 189 | −15 | 0 | 0 |
| 190 | −14 | 0 | 0 |
| 191 | −13 | 0 | 0 |
| 192 | −12 | −2.615468942 | 0.671534626 |
| 193 | −11 | 0 | 0 |
| 194 | −10 | 0 | 0 |
| 195 | −9 | 0 | 0 |
| 196 | −8 | 2.150688169 | 1.113226508 |
| 197 | −7 | 0 | 0 |
| 198 | −6 | 0 | 0 |
| 199 | −5 | 0 | 0 |
| 200 | −4 | 3.294802441 | 2.111432716 |
| 201 | −3 | 0 | 0 |
| 202 | −2 | 0 | 0 |
| 203 | −1 | 0 | 0 |

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for communicating in an oversampled orthogonal frequency-division multiplexing (OFDM) orthogonal network, wherein a preamble used for time synchronization does not have an ideal autocorrelation function, comprising a processor in a transmitter for performing steps of the method, comprising the steps of
constructing a zero-correlation-zone (ZCZ) based preamble for time synchronization, wherein a cross correlation function (CCF) used for time synchronization is forced to 0 within a certain region around a main lobe, and a length of the ZCZ is guaranteed to be larger than a cyclic prefix length of OFDM data symbols to increase synchronization accuracy; and
transmitting the OFDM symbols with the ZCZ based preamble.

2. The method of claim 1, wherein for two preambles $x_l$ and $y_l$ with a same length L, a circular convolution output sequence $Z_l$, $l=0, 1, \ldots, L-1$, between the two preambles is $$z_l = x_l \otimes y_l = \sum_{m=0}^{L-1} x_m y_{(l-m)_L} = \sum_{m=0}^{l} x_m y_{l-m} + \sum_{m=l+1}^{L-1} x_m y_{L+l-m},$$

where $(\ )_L$ denotes a modulus operation after division by L, and $\otimes$ is a circular convolution operator, and wherein the CCF is $$\psi_{xy}(\tau) = x_\tau \otimes y^*_{-\tau} = \sum_{m=0}^{L-1} x_m y^*_{(m-\tau)_L}.$$

where $\tau$ is a timing offset.

3. The method of claim 1, wherein the preamble includes a first symbol for signal detection, automatic gain control, and frequency offset estimation, a second symbol for synchronization, and a third symbol for channel estimation.

* * * * *